April 21, 1964   M. HÄRTWIG   3,129,724
SOLENOID CONTROLLED DISTRIBUTING VALVE
Filed Aug. 9, 1961
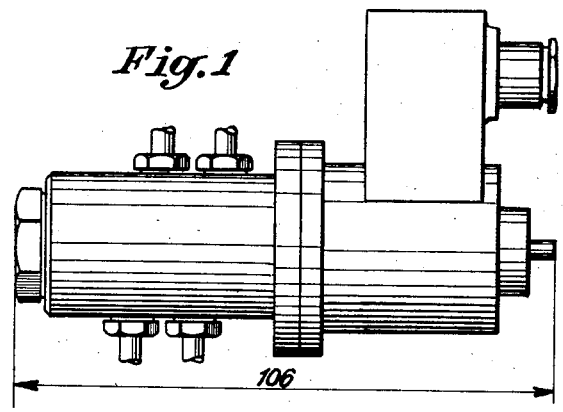
Fig.1
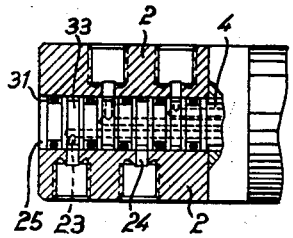
Fig.6
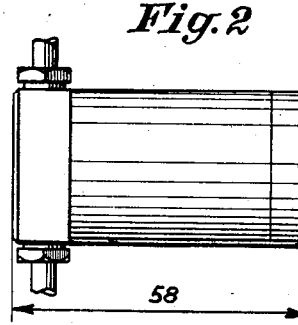
Fig.2
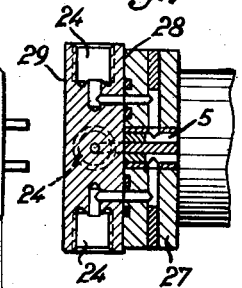
Fig.7
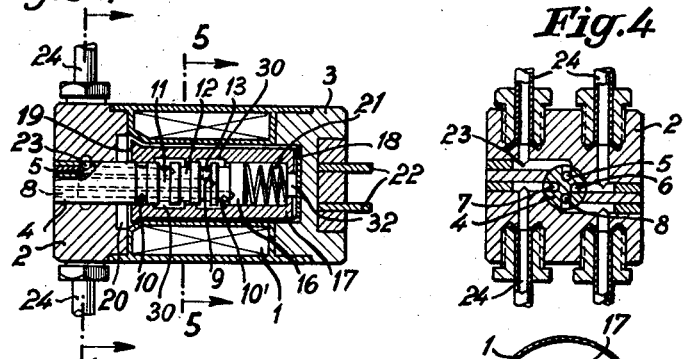
Fig.3  Fig.4
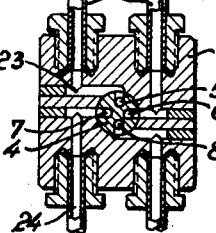
Fig.5
INVENTOR
Manfred Härtwig
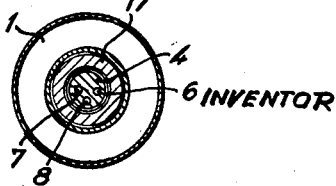

United States Patent Office 3,129,724
Patented Apr. 21, 1964

3,129,724
SOLENOID CONTROLLED DISTRIBUTING
VALVE
Manfred Härtwig, Nellingen, near Esslingen, Germany, assignor to Erich Herion, Stuttgart-Frauenkopf, Wurttemberg, Germany
Filed Aug. 9, 1961, Ser. No. 130,294
Claims priority, application Germany Aug. 13, 1960
9 Claims. (Cl. 137—625.48)

The present invention relates to a solenoid-controlled distributing slide valve and more particularly to such a valve which forms a normal gate valve or a multiway valve, and it is the principal object of the invention to provide a valve of this type which is of a simpler design, more easily manufactured, and considerably smaller than the conventional valves so that the over-all dimensions of the valve are limited substantially to those of the solenoid and the necessary connections for the valve.

This object is attained according to the invention by mounting the control piston of the valve, which is provided with recesses forming control edges, in a stationary position, by providing the inlet and outlet channels to and from these recesses within this piston in the longitudinal direction thereof, by providing on this piston an axially slidable sleeve which has inner recesses associated with the recesses in the stationary piston for controlling the inlet and outlet channels, and by making this slidable sleeve of a magnetizable material so as to form the armature of the control solenoid, the winding of which surrounds this armature.

This sleevelike armature as well as the stationary control piston is therefore almost entirely disposed within the solenoid winding. In this manner it is possible to limit the dimensions of such a slide valve to the usual required size of the solenoid winding and the ferric magnetic circuit of the solenoid, since the slidable sleeve on the stationary control piston and within the solenoid winding serves the double function of an armature and the movable control element of the valve.

The armature sleeve is preferably cup-shaped and the bottom end of the sleeve is slidable within the valve housing to form a magnetic circuit, while the free end of the sleeve forms the means for closing the field. According to a further embodiment of the invention, the edge of this free end of the sleeve may be provided with an enlargement, preferably by being conically enlarged or widened so as to build up a stronger field and at the same time to serve as a shock absorber within a chamber in the valve housing for the movements of the armature sleeve.

The control edges which are formed by the annular recesses in the piston are connected with the inlet and outlet of the valve housing by axially adjacent bores within the piston, and both the beginning and the end of the piston are preferably provided with an annular recess which is connected with the return line and the ends of the armature sleeve in such a manner that the sleeve will be movable practically without having to overcome any pressure while at the same time a special connection for the leakage oil may be omitted.

The slide valve according to the invention has the advantage that the mass which has to be moved in the operation of the valve is very small and that the arrangement of a slidable armature sleeve on a stationary piston through which the pressure medium is supplied permits a considerably smaller amount of play to be applied since even a very high pressure only has the tendency to increase the play so that any binding or wedging of the armature sleeve will be prevented. Furthermore, the leakage losses of the valve according to the invention are considerably lower than those of a conventional slide valve and the valve according to the invention may be made of considerably smaller dimensions. The slide valve according to the invention is also very resistant to external influences and jars exerted thereon from the outside, and it is easily assembled and mounted since minor disalignments of its parts are of no consequence.

The aforementioned objects, features, and advantages of the present invention will become more clearly apparent from the following detailed description thereof, particularly when the same is read with reference to the accompanying drawings, in which:

FIGURE 1 shows a side view of a solenoid-controlled distributing slide valve of the conventional type of construction;

FIGURE 2 shows for comparison a side view of a slide valve according to the invention which has the same flow area as the valve according to FIGURE 1;

FIGURE 3 shows a longitudinal section of the slide valve according to FIGURE 2;

FIGURE 4 shows a cross section taken along line 4—4 of FIGURE 3;

FIGURE 5 shows a cross section taken along line 5—5 of FIGURE 3;

FIGURE 6 shows a longitudinal section of a part of a slide valve according to a modification of the invention; while FIGURE 7 shows a longitudinal section of a part of a slide valve according to a further modification of the invention.

FIGURE 1 of the drawings illustrates a solenoid-controlled distributing slide valve of the conventional type in which the control sleeve is stationary and the control piston is movable in the axial direction and is connected to the armature of a control magnet. The overall axial dimension of such a slide valve is the sum of the corresponding dimensions of the slide valve itself and of the control magnet. According to the invention, however, as indicated in FIGURE 2, it is possible to reduce the total axial dimensions of such a distributing slide valve to almost one half of the former demensions without any change in the flow area and in the control output.

FIGURE 3 shows a longitudinal section of the valve according to FIGURE 2, in which the solenoid winding 1 surrounds all of the parts to be controlled. For this purpose, the housing includes two axially terminal parts 2 and 3 and forms the ferric magnetic circuit for the solenoid winding 1, and a cavity in the housing contains a stationary piston or plunger 4 which, if the valve is a four-way slide valve as illustrated, contains the inlet and outlet channels 5 to 8. The present invention is, however, also similarly applicable to gate valves and multiway valves.

These inlet and outlet channels 5 to 8 for the pressure medium which extend in the form of bores in the longitudinal direction of the piston terminate into separate transverse bores 9 in annular recesses 10, 10', 11, 12, and 13. Piston 4 is fixedly mounted on the housing part 2, and is enclosed by an armature sleeve 17 which is cup-shaped and has an end wall 18. This sleeve 17 is sealingly mounted on piston 4 so as to be freely slidable in the axial direction and it is provided with annular recesses 30 which are associated with recesses 10 to 13 in piston 4. Sleeve 17 consists of a magnetizable material so that, when winding 1 is energized, the sleeve may move to one or the other end position, depending upon which end of the sleeve is designed to close the magnetic field.

In the particular embodiment of the invention as illustrated, the right end 18 of the sleeve is slidably mounted in the axial direction in the housing part 3, and the free end 19 of the sleeve will then form with the housing part 2 the closing position of the field. This end 19 of the sleeve is for this purpose made of a greater radial width, preferably in the form of a conically enlarged edge portion. In this manner, the sleeve end 19 may form a shock absorber in a recess 20 of housing part 2 depending upon the amount of play between the free edge of the sleeve and the wall of the chamber formed by recess 20. This chamber 20 and the remaining opposite end of the sleeve are then connected through the channel 8 with the two recesses 10 and 10' in piston 4 and also with the outside through the clearance between the wall of the sleeve and the walls surrounding the same and through bore 32 in the end wall 18 of the sleeve. Chamber 20 is further connected to the return line in such a manner that the armature sleeve will move within the tubular solenoid without having to overcome any pressure since the oil leakage which might accumulate in such a device will be under the pressure in the return line and thus freely movable at every operation of the valve from one end to the other end of the armature sleeve. Such a valve construction also renders a special connection for the leakage oil unnecessary.

Between piston 4 and armature sleeve 17 a compression spring 21 is mounted which determines the basic position of sleeve 17. The housing part 3 is further provided with terminals 22 in the form of connecting plugs so that the solenoid may be connected to the current source in a very simple manner.

Bores 5 to 8 in the part of piston 4 which is inserted in housing part 2 terminate into transverse bores 23 which lead to the pipe connections 24 of housing part 2.

FIGURE 4 shows four pipe connections 24 arranged in opposite pairs in the housing part 2 of the four-way valve illustrated. The longitudinal bores 5 to 8 in piston 4 then extend likewise in pairs parallel to each other through the remainder of housing part 2. The connections 24 extend vertically to these pairs of channels and each connection 24 leads to only one channel of one pair through connecting bores. FIGURE 4 also shows the individual channels 5 to 8, which extend in the longitudinal direction of piston 4, in their particular position in relation to the individual recesses 10, 10' to 13.

The cross section of the slide valve according to FIGURE 5 also illustrates the stationary piston 4 with the longitudinal bores 6 to 8 and the armature sleeve 17 with the solenoid winding 1.

If the stationary piston 4 should be designed so as to be removable from the housing part 2, the slide valve according to the invention may be modified, for example, in the manner as illustrated in FIGURE 6. The free end of the stationary piston 4 is then provided with annular recesses 33 into which the individual longitudinal bores 5 to 8 terminate through transverse bores 23. The free parts 31 of the end of the piston between recesses 33 are provided with sealing means in suitable further recesses for separating the pressure chambers from each other, so that the end of the piston may be inserted into a bore 25 in housing part 2. The connections 24 of housing part 2 are then likewise connected by bores with the recesses 33 in the free end of piston 4. Such a piston is easily exchangeable by a simple plugging operation without requiring the connections 24 to be changed or removed. Recesses 33 and the respective bores are then offset relative to each other, as illustrated in FIGURE 6.

FIGURE 7 shows a further modification of the invention in which the longitudinal bores 5 to 8 by passing through a separate intermediate member 27 first extend laterally, and it further shows that this intermediate member 27 has a surface 28 into which the channels terminate. This member 27 may then be flanged upon a further housing part 29 which contains the different connections 24. It is, however, also possible to enlarge the free end of the piston itself and to extend the axial channels laterally to the outside, for example, through inclined bores which may then form the connections 24.

It is also possible to design both ends of the armature sleeve 17 as surfaces for the closing position of the magnetic field so that, if two solenoid windings are provided adjacent to each other in the axial direction, the armature sleeve may move to two different end positions when one or the other solenoid winding is energized. The armature sleeve then operates as a flow reversing valve. Finally, the armature sleeve may also be arrested by spring means at its central position so that it will then serve as a three-position valve to control the individual channels.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An electrically operated slide valve comprising:
    (a) a valve housing defining a cavity therein, said housing being of magnetizable material, and said cavity having an axis;
    (b) a plunger member fixedly mounted on said housing and axially projecting therefrom into said cavity, the projecting portion of said plunger member and said housing defining an annular space in said cavity;
    (c) a sleeve member of magnetizable material axially slidable on said plunger member in said annular space, said sleeve member sealingly engaging said plunger member;
    (d) solenoid means interposed between said sleeve member and said housing in said annular space and energizable for actuating axial sliding movement of said sleeve member on said plunger member between a plurality of axial positions,
    (e) said plunger member being formed with a plurality of spaced recesses facing said sleeve member, and
    (f) said sleeve member being formed with a recess facing said plunger member and simultaneously alignable with said spaced recesses in a selected one of said axial positions; and
    (g) a plurality of conduits respectively communicating with said spaced recesses, whereby communication between said conduits is controlled by said solenoid means.

2. A slide valve as set forth in claim 1, wherein said housing has two terminal parts axially defining said cavity, said solenoid means extending between said terminal parts.

3. A slide valve as set forth in claim 2, wherein said plunger member is formed with a plurality of axially extending channels respectively communicating with said spaced recesses, and is mounted on one of said terminal portions, said one portion being formed with a plurality of bores respectively connecting said channels with said conduits.

4. A slide valve as set forth in claim 1, wherein said sleeve member is substantially cup shaped.

5. A slide valve as set forth in claim 1, further comprising yieldably resilient means permanently urging said sleeve member in one axial direction, said solenoid means when energized actuating movemeint of said sleeve member in an axial direction opposite to said one direction.

6. A slide valve as set forth in claim 1, wherein said plunger member is releasably mounted on said housing.

7. A slide valve as set forth in claim 2, wherein one of said terminal parts is formed with a recess open toward said cavity, and a portion of said sleeve member is received in the recess of said terminal part in said plurality of axial positions of said sleeve member.

8. A slide valve as defined in claim 2, wherein said sleeve member has a radial enlargement adjacent said solenoid means for increasing the field closing surface of said sleeve member.

9. A slide valve as defined in claim 3, wherein said one part of said housing has a recess facing said armature sleeve, an axial end portion of said sleeve having a conical enlargement adjacent said solenoid means for increasing the field closing surface of said sleeve, said enlargement axially moving inward and outward of said recess when said sleeve member moves between said positions thereof.

References Cited in the file of this patent

UNITED STATES PATENTS

| | | |
|---|---|---|
| 1,571,401 | Erickson | Feb. 2, 1926 |
| 2,637,344 | Matthews | May 5, 1953 |
| 2,742,056 | Williams | Apr. 17, 1956 |
| 2,782,801 | Ludwig | Feb. 26, 1957 |
| 2,861,594 | Collins | Nov. 25, 1958 |
| 2,877,795 | Cocklin | Mar. 17, 1959 |